United States Patent
Patel et al.

(10) Patent No.: US 6,866,198 B2
(45) Date of Patent: Mar. 15, 2005

(54) IMAGING BAR CODE READER WITH MOVING BEAM SIMULATION

(75) Inventors: Mehul Patel, Fort Salonga, NY (US); Walter Preuss, Glen Head, NY (US); Paul Dvorkis, East Setauket, NY (US)

(73) Assignee: Symbol Technologies, Inc., Hoatsville, NY (US)

( * ) Notice: Subject to any disclaimer, the term of this patent is extended or adjusted under 35 U.S.C. 154(b) by 0 days.

(21) Appl. No.: 10/271,039

(22) Filed: Oct. 15, 2002

(65) Prior Publication Data

US 2004/0069855 A1 Apr. 15, 2004

(51) Int. Cl.[7] .............................................. G06K 7/10
(52) U.S. Cl. ..................... 235/472.01; 235/462.08; 235/462.2; 235/462.25; 235/462.26; 235/462.45
(58) Field of Search .................. 235/472.01, 462.06, 235/470, 462.01, 467.4, 472, 462.45, 462.08, 462.2, 462.25, 462.26

(56) References Cited

U.S. PATENT DOCUMENTS

| | | | | |
|---|---|---|---|---|
| 5,283,699 A | * | 2/1994 | Komai et al. ............ | 235/462.42 |
| 5,354,977 A | * | 10/1994 | Roustaei ................ | 235/462.11 |
| 5,481,099 A | * | 1/1996 | Dvorkis ................. | 235/462.36 |
| 5,621,203 A | * | 4/1997 | Swartz et al. .......... | 235/462.11 |
| 5,747,785 A | * | 5/1998 | Miller et al. ............ | 235/472.01 |
| 5,798,516 A | * | 8/1998 | Shreesha ................ | 235/462.42 |
| 5,874,720 A | * | 2/1999 | Dvorkis et al. ......... | 235/462.32 |
| 5,949,052 A | * | 9/1999 | Longacre et al. ....... | 235/462.08 |
| 5,959,286 A | * | 9/1999 | Dvorkis et al. ............. | 235/470 |
| 5,969,323 A | * | 10/1999 | Gurevich et al. ....... | 235/462.06 |
| 6,073,848 A | * | 6/2000 | Giebel .................... | 235/462.26 |
| 6,124,950 A | * | 9/2000 | Honda ......................... | 358/474 |
| 6,145,743 A | * | 11/2000 | Dvorkis et al. ......... | 235/462.01 |
| 6,149,061 A | * | 11/2000 | Massieu et al. ......... | 235/462.33 |
| 6,163,414 A | * | 12/2000 | Kikuchi et al. .............. | 359/776 |
| 6,491,225 B1 | * | 12/2002 | Dvorkis et al. ......... | 235/472.01 |
| 6,601,768 B2 | * | 8/2003 | McCall et al. .......... | 235/462.42 |
| 6,749,120 B2 | * | 6/2004 | Hung et al. ............. | 235/472.01 |
| 2002/0043562 A1 | * | 4/2002 | Zazzu et al. ................. | 235/457 |
| 2002/0044205 A1 | * | 4/2002 | Nagaoka et al. ............. | 348/229 |
| 2002/0067341 A1 | * | 6/2002 | Kobayashi ................... | 345/157 |
| 2002/0117547 A1 | * | 8/2002 | Krichever .............. | 235/462.01 |
| 2002/0117574 A1 | * | 8/2002 | Hawley .................... | 242/422.8 |
| 2003/0024990 A1 | * | 2/2003 | Wilz et al. .............. | 235/462.45 |
| 2003/0218069 A1 | * | 11/2003 | Meier et al. ............ | 235/462.25 |
| 2004/0056101 A1 | * | 3/2004 | Barkan et al. .......... | 235/472.03 |

* cited by examiner

*Primary Examiner*—Michael G. Lee
*Assistant Examiner*—Allyson N Trail
(74) *Attorney, Agent, or Firm*—Kirschstein et al.

(57) ABSTRACT

The operating environment of a moving laser beam in a flying spot, electro-optical reader is simulated in a solid-state, sensor-based imaging reader by turning a visible line produced by a light emitting diode on and off prior to capturing a two-dimensional image of a target.

18 Claims, 8 Drawing Sheets

IMAGING BAR CODE READER WITH MOVING BEAM SIMULATION

BACKGROUND OF THE INVENTION

1. Field of the Invention

The present invention generally relates to electro-optical imaging systems using solid-state sensors for recording a target image, including optical code readers and digital cameras. Aspects of the invention are particularly useful in linear sensor-based and two-dimensional sensor-based, handheld bar code readers. More specifically, the present invention relates to simulating the appearance of a flickering laser beam in such imaging systems.

2. Description of the Related Art

Optical codes are patterns made up of image areas having different light reflective or light absorptive properties, which are typically assembled in accordance with a priori rules. The term "bar code" is sometimes used to describe certain kinds of optical codes. The optical properties and patterns of optical codes are selected to distinguish them in appearance from the background. Devices for identifying or extracting data from optical codes are sometimes referred to as "optical code readers" of which bar code scanners are one type. Optical code readers are used in both fixed and portable installations in many diverse environments such as in stores for checkout services, in manufacturing locations for work flow and inventory control, and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor which is manually directed at a target code.

Most conventional code readers are designed to read one-dimensional bar code symbols. The bar code is a pattern of variable-width rectangular bars separated by fixed or variable width spaces. The bars and spaces have different light reflecting characteristics. One example of a one-dimensional bar code is the UPC/EAN code.

Bar codes have traditionally been read by sweeping a laser beam across the codes, and by detecting light reflected off the codes. The detected light is electronically processed to generate data related to the code. The laser beam is swept at a scanning rate of many times per second, e.g., 20 or 40 scans per second. To a user, the laser beam appears to flicker and, hence, over the course of time, a user expects to see a flickering laser beam during reading of the codes. The flickering beam serves as a visual cue that the system is in operation.

Bar codes can also be read by employing solid-state imaging devices. For example, an image sensor may be employed which has a two-dimensional array of cells or photosensors which correspond to image elements or pixels in a field of view of the device Such an image sensor may be a two-dimensional or area charge coupled device (CCD) and associated circuits for producing electronic signals corresponding to a two-dimensional array of pixel information for a field of view. A one-dimensional linear array of photodiodes may also be used in detecting a bar code reflection image (see, e.g., U.S. Pat. No. 6,138,915 to Danielson et al., which is herein expressly incorporated by reference).

It is known in the art to use a CCD image sensor and objective lens assembly in an optical code reader. In the past, such systems have employed complex objective lens assemblies originally designed for relatively expensive video imaging systems. Such systems may have a single sharp focus and a limited depth of field, which along with conventional aiming, illumination and signal processing and decoding algorithms, limits the versatility and working range of the system.

However, the solid-state imagers provide no visual cue as to their operation. There is no flickering laser beam. A user, expecting a flickering beam, instead sees nothing since the solid-state imager acts like a camera and merely receives light from the target.

To provide illumination and to assist in aiming, imaging systems can employ either lasers or light emitting diodes (LEDs). LEDs may be preferred over lasers since the incoherent nature of the LED light source does not produce the speckle noise impact that is produced by lasers. Further, LEDs are more cost effective than lasers due to the ease of manufacturing and packaging of LEDs. Additionally, LEDs can be built more compactly and are easier to surface mount than lasers.

However, compared to lasers, LEDs are not an ideal point source. Specifically, light produced by an LED is less focused which produces an increased line thickness of the projected light. To reduce the line thickness of the light produced by an LED, many designers place a mechanical slit in front of the LED. However, the mechanical slit reduces the amount of light that is projected by the LED onto an object. In any event, during use, the LED is constantly energized to maximize the collected light and to enhance the aiming.

SUMMARY OF THE INVENTION

Briefly, and in general terms, the present invention provides an arrangement for simulating a scanning laser beam in a system for electro-optically reading indicia, such as bar code symbols, by imaging light reflected off the indicia over two mutually orthogonal directions, especially by a solid-state sensor such as a charge coupled device (CCD) array or a complementary metal oxide semiconductor (CMOS) array.

The arrangement includes a light emitting diode (LED) component for emitting visible light, an optical component for optically modifying the visible light to form a visible line across the indicia, and means for turning the visible line on and off. This action simulates the scanning laser beam which, in use, fluctuates or flickers on the indicia.

A user of known moving laser beam scanners expects to see such a non-stable, flickering scan line on and across the indicia being read. Upon using a solid-state sensor which utilizes no such laser, the user seeing no flickering action may be uncertain that the system is working. This invention, therefore, provides visual feedback to the user and simulates the operating environment that the user has come to expect.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENTS

Figure 1:
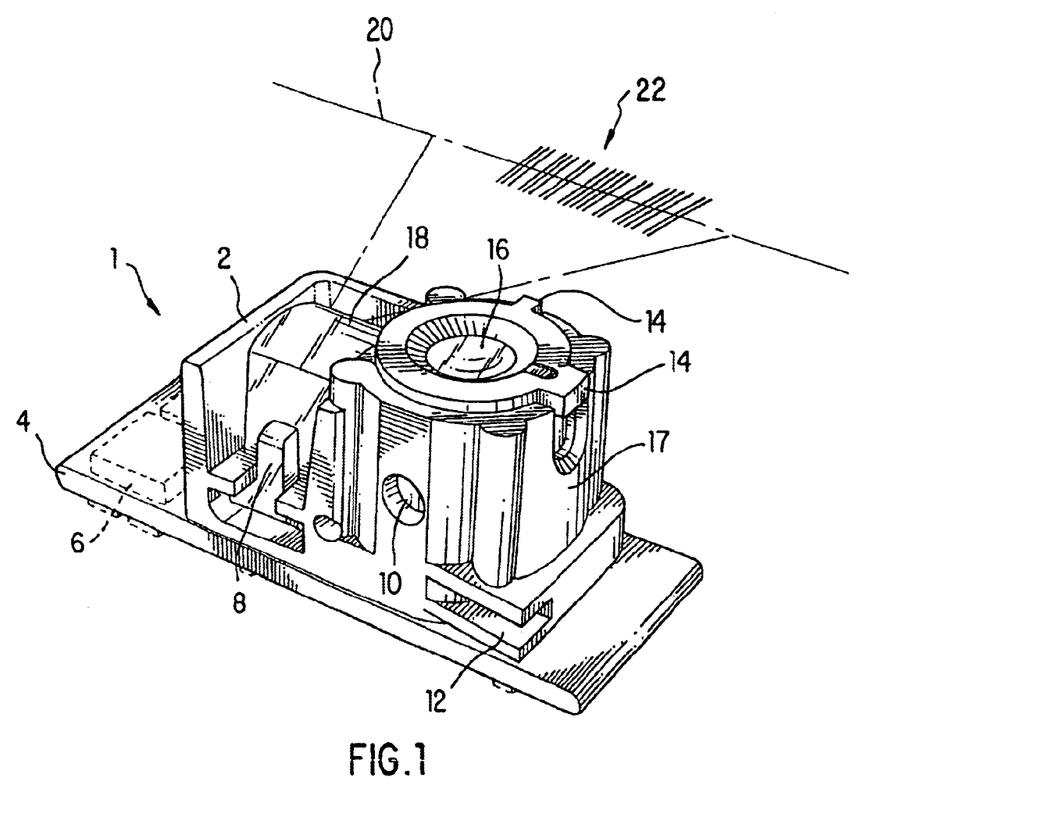
FIG. 1 schematically illustrates an opto-electronic module for use in a bar code reader in accordance with a preferred embodiment.

FIG. 1 schematically illustrates an opto-electronic module 1 for use in a bar code reader 1 in accordance with a preferred embodiment. The module 1 includes a frame 2 preferably made of plastic or other molded polymeric and/or synthetic material. A printed circuit (PC) board 4 is coupled with the frame 2. Although not shown in FIG. 1 (see, e.g., FIG. 3A), the PC board 4 has a semiconductor sensor device 704 and an LED 702 mounted thereon (see also FIGS. 4A–4E). The semiconductor sensor device preferably includes a single CMOS chip having a linear array of pixels that are each elongated orthogonal to the linear direction of the array, i.e., parallel to the bars of a bar code symbol 22. The LED 702 is preferably also elongated such that it is narrower in the focusing direction of a lens 18, wherein lens 18 is preferably cylindrical/toroidal and is cylindrical on one side and toroidal on the other, and generally, lens 18 has greater optical power in the direction of the bars forming the bar code. The PC board 4 preferably includes other semiconductor chips 6 for processing signals received from the sensor device. For example, these other chips 6 may include a chip for storing electronic images and/or a chip for decoding the signals.

The lens 18, which is preferably cylindrical/toroidal, as mentioned, or at least having high power in the direction of the bars of the bar code symbol 22, is inserted into the frame 2 for focusing light emitted from the LED 702 as a visible aiming beam 20 for the bar code reader 1. That is, when the aiming beam is aligned with the bar code symbol 22, as shown in FIG. 1, the bar code reader 1 is properly aligned for reading the bar code symbol 22. A molded plastic portion 8 of the lens 18 is used for aiding in the insertion of the lens 18 into the frame 2.

When the aiming beam 20 is aligned with the bar code symbol 22 as shown in FIG. 1, a focusing lens 16 images the bar code symbol onto the sensor device on the PC board 4. The focusing lens 16 is preferably mounted in a lens barrel which fits into a cylindrical sleeve 17 in the frame 2. One or more notches 14, e.g., as shown in FIG. 1, may be used for positioning the lens barrel within the sleeve 17. The lens barrel including the focusing lens 16 is aligned relative to the sensor device, and is then fixed to the frame 2, e.g., using a glue hole 10, as shown in FIG. 1 or by other means understood by those skilled in the art such as a bolt or hook fastener assembly. A notch 12 is also shown in FIG. 1 that may be preferably used for holding the module 1 in place during the assembly process.

The focusing lens 16 is itself preferably substantially a wide angle lens, e.g., 35 °–40° for reading one-dimensional bar code symbols such as the bar code symbol 22 illustrated schematically in FIG. 1. Therefore, a bar code symbol 22 that is substantially two inches from the lens 16, and out to substantially six inches from the lens 16, may be captured. For reading one-dimensional bar code symbols 22, the aperture for the lens 16 is preferably elliptical, and may alternatively be circular, square, rectangular or otherwise. The system preferably operates to capture the bar code images with no artificial illumination. The lens 16 is preferably spherical for capturing more light than an alternative cylindrical lens would. Illumination may alternatively be used with a cylindrical lens 16.

Figure 2A:
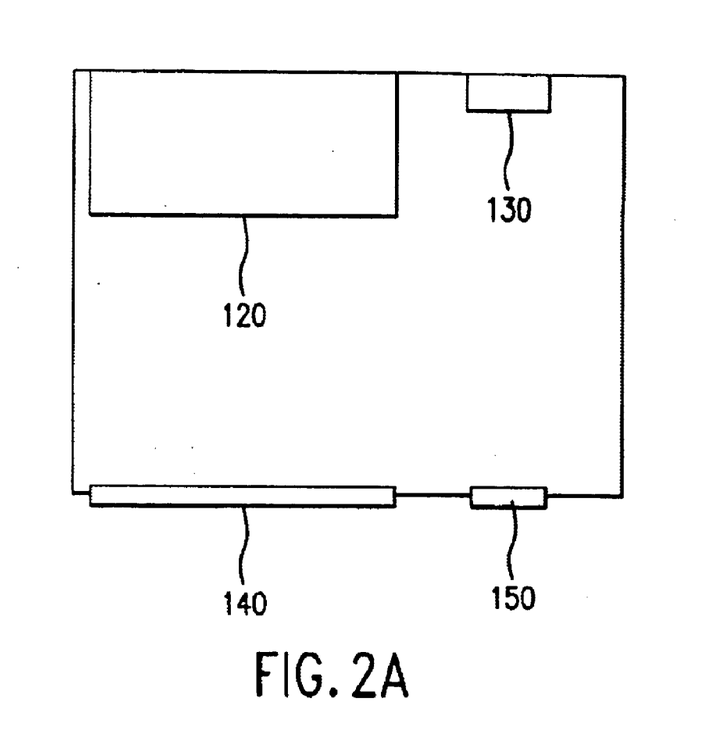
FIGS. 2A and 2B respectively schematically illustrate a top view and a side view of a miniature imager in accordance with an exemplary embodiment.
Figure 2B:
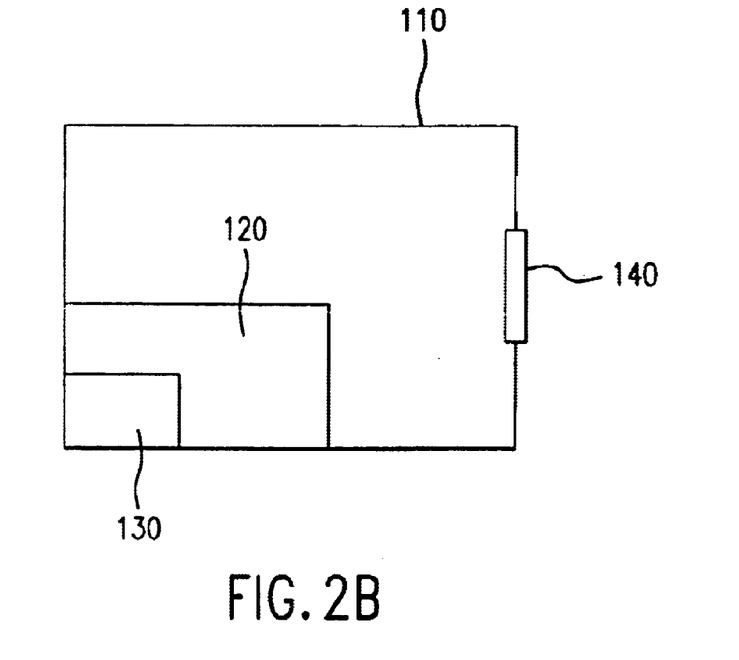

FIGS. 2A–2B respectively illustrate schematically in block form cross-sectional top and side views of a bar code reader in accordance with the preferred embodiment shown in FIG. 1. The bar code reader is incorporated into a molded optical package 110 corresponding to the frame 2 of FIG. 1. Structures and techniques for so doing are disclosed in U.S. patent application Ser. No. 09/880,906, filed Jun. 15, 2001 to Mazz et al., entitled "Molded Imager Optical Package and Linear Detector-Based Scan Engines", which is assigned to the same assignee as the present application and is hereby incorporated by reference herein. The molded optical package includes an imaging/decoder integrated circuit (IC) 120 and imaging/focusing lens 140 corresponding to lens 16 of FIG. 1, and aiming light emitting diode or diodes (LED) 130 and aiming lens 150 corresponding to lens 18 of FIG. 1 (which are preferably not configured for broad illumination of bar code symbols, but may be alternatively configured to illuminate bar code symbols). In accordance with a preferred embodiment, the imaging/decoder IC 120 is fabricated in accordance with known complementary metal oxide semiconductor (CMOS) techniques. Alternatively, the imaging/decoder IC 120 can comprises a CCD imager with associated decoding circuitry.

In operation, the imaging/decoder IC 120 receives an image via imaging/focusing lens 140. To assist in aligning the target image (e.g., one-dimensional bar code symbol 22 of FIG. 1) to be focused by lens 140 to a sensor array of IC 120, an aiming beam is generated by focusing light emitted from LEDs 130 on the target image via aiming lens 150. The location of the target image in the proper field of view of the imaging/decoder IC is aided by projecting an aiming pattern on the target image using the aiming LEDs 130. Illumination/aiming LEDs are focused on a target image through illumination/aiming lenses 150.

In accordance with a preferred embodiment, the volume of the imaging system is scaled by scaling the pixel pitch of the detector array of imaging/decoder IC 120. It will be recognized that the pixel pitch refers to the spacing between image elements, i.e., pixels, on an image sensor. When the pixel pitch is decreased, the focal length is decreased to maintain a comparable field of view. If the aperture size is kept constant, then the same amount of light is collected per pixel and there is not a loss in imager sensitivity. If the size of the aperture is not limiting the size of the imager, then in a two-dimensional imaging system all three dimensions scale by the scale factor of the pixel. In a one-dimensional imaging system, two dimensions scale by the scale factor of the pixel. The imaging engine of the preferred embodiment is designed to provide a similar depth of focus and similar light throughput for each pixel. This results in a balance with the pixel dynamic range and pixel quantum efficiency.

In a preferred embodiment, the bar code reader of FIGS. 2A–2B has a CMOS detector array 120 with an approximately 1 –4 mm length of 256 to 512 pixels each having about a 5 –8 micron width. This results in an advantageously small detector length. The focal length of the system is approximately 5 mm.

In the preferred one-dimensional system of the preferred embodiments, the detector footprint can be further minimized by making two or more rows of pixels offset, e.g., staggered, from one another. For example, an array of 500 pixels with 3 mm pitch has a length of 1.5 mm. By laying out the array as two adjacent rows offset by half of a pixel, the pixel pitch is maintained at 3 mm, but the detector array has a resultant length of 0.75 mm. Since the arrays are offset by half of a pixel, the pixel values can be combined to obtain a resolution equivalent to a 1.5 mm sensor. The pixel pitch is maintained at a reasonable level for absorbing photons, but the detector footprint, and thus, the total volume of the system can be dramatically decreased.

In accordance with exemplary embodiments, the imaging detector array, read-out electronics, analog-to-digital converter and decoding logic are all integrated into a single chip. The imaging/decoding chip is mounted on a carrier with at least one LED die or a small laser. The carrier can be an FR4 substrate, an industry recognized organic substrate, and may contain a lead frame or solder bumps for attachment to a larger circuit board. The carrier is covered with a molded plastic piece that has the optical surfaces molded into it. The molded plastic cover is optical quality and can tolerate temperatures encountered in automated circuit board assembly. The device may be configured as a complete scanner, including opto-mechanics and electronics, which could be handled like a surface mount integrated circuit and be compatible with re-flow soldering techniques. The device may be mechanically attached to a circuit board by solder joints only. Accordingly, screws or other mechanical supports would not be required, thus reducing the size and complexity of a device which incorporates this imaging engine.

Figure 3A:
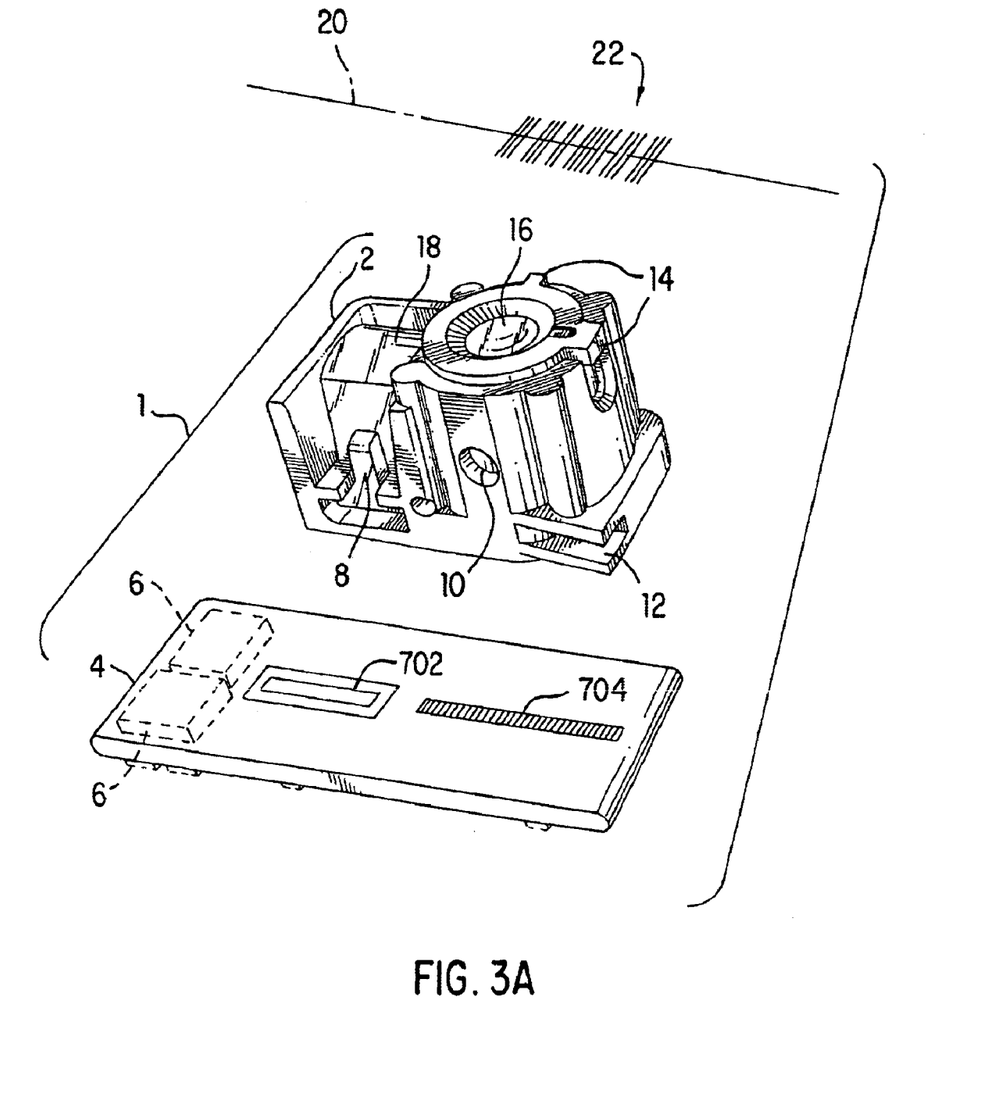
FIGS. 3A and 3B are exploded schematic representations of a bar code reader in accordance with a preferred embodiment.
Figure 3B:
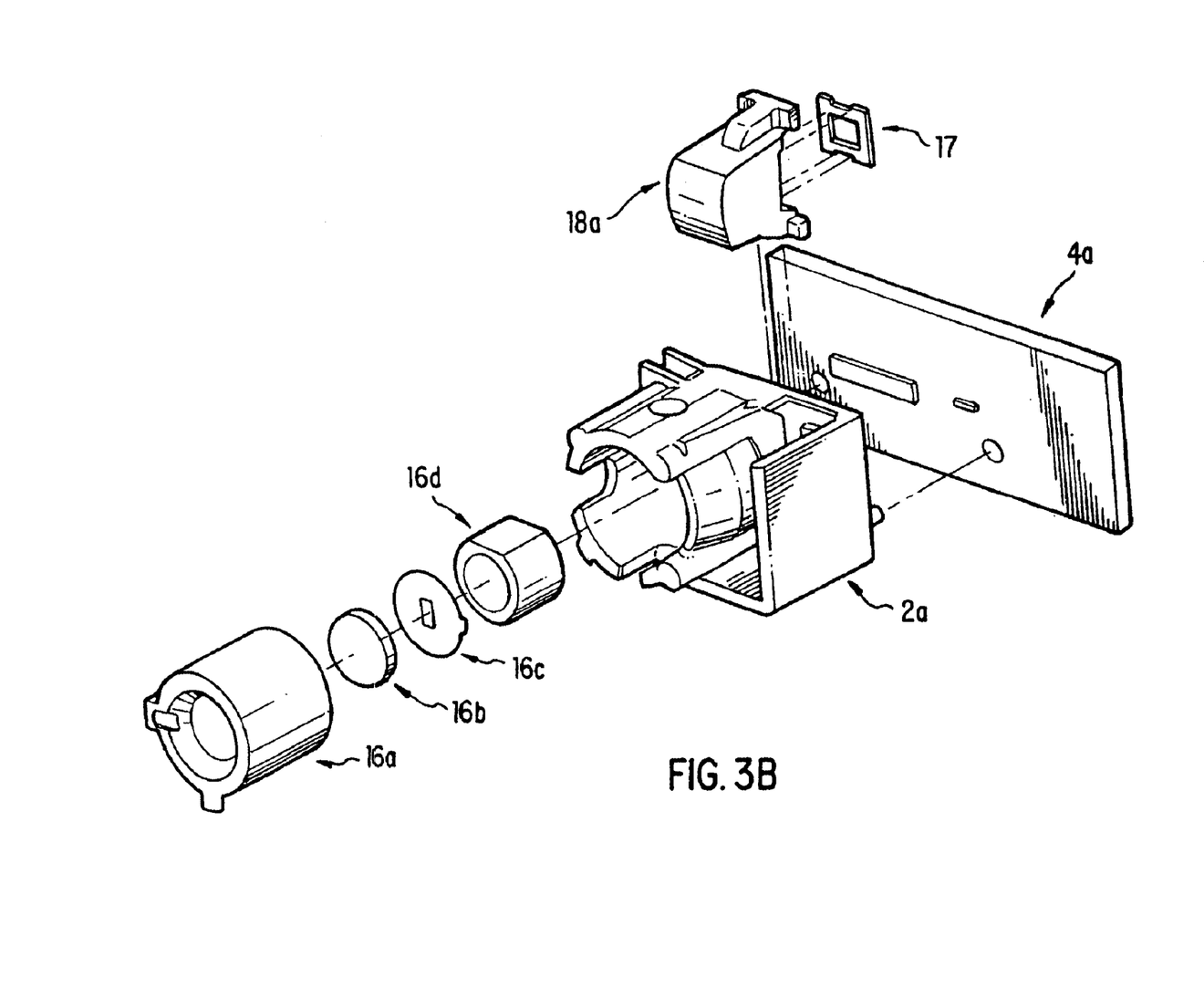

FIGS. 3A–3B are exploded schematic representations of the bar code reader 1. Referring to FIG. 3A, the bar code reader 1 includes the frame 2 and PC board 4 of FIG. 1. The frame 2 is shown with the cylindrical/toroidal lens 18 including the molded plastic portion 8 inserted therein, the sleeve 17 with lens barrel containing the focusing lens 16 inserted therein, and the notches 12 and 14 and the glue hole 10, as described above with reference to FIG. 1. The PC board 4 is separated from the frame 2 in the exploded representation of FIG. 3A so that the LED 702 and sensor device 704 of the PC board 4 may be schematically illustrated. It is noted that the LED 702 and sensor device 704 are not drawn to scale in FIG. 3A (preferred dimensions are provided hereinbelow). It is also noted that the orientation of the bar code reader 1 with respect to the bar code symbol 22 is that its elongated direction is perpendicular to the bar code stripes or bars, as shown, and the proper orientation may be rotated, e.g., by 90°, with the orientations of the lenses 16, 18 and the LED 702 and sensor device 704 correspondingly rotated.

The LED 702 for emitting visible light focused by lens 18 to cross the bar code symbol 22 as the aiming beam 20 is shown next to the chips 6, which may be image storage and decoding chips 6. The LED 702 is preferably elongated with its narrow dimension in the focusing direction of the lens 18. The lens 18 preferably has higher power in the direction of the bar code stripes, is preferably cylindrical/toroidal, and may alternatively be purely a cylindrical lens, or may have some power in the orthogonal direction, e.g., such as to expand the aiming beam orthogonal to the bar code stripes and/or to direct the aiming beam somewhat to the right in FIG. 3A to compensate the LED 702/lens 18 portion of the bar code reader 1 being offset from the sensor device 704/focusing lens 16 portion of the bar code reader which is preferably centered on the bar code symbol 22 when an image is captured. The LED 702 is preferably a single, elongated LED device, as shown, and may alternatively include a single LED of arbitrary shape or multiple LEDs of arbitrary shape and location, with the condition that the LED 702/lens 18 combination produce a suitable aiming beam.

The sensor device 704 preferably includes a single semiconductor chip 704. This sensor device chip 704 preferably includes multiple sensor pixels arranged as a linear array, as shown in FIG. 3A. In a preferred embodiment, the device includes no more than 512 pixels, and preferably between 256 and 512 pixels. An arbitrary number of pixels may be used between a minimum number (e.g., 256) such that the pattern of the bar code symbol 22 is resolveable and a maximum number (e.g., 512) depending on size constraints due to the selected dimensions of the PC board 4 and the focusing properties of the selected lens 16. Although a single row is preferred, more than one row of pixels may be included. For example, two rows of pixels staggered by half their width may make up the sensor device 704 such that the resolution may be enhanced.

The pixels themselves are preferably elongated in the direction of the bar code stripes, as shown in FIG. 3A. The aspect ratio of the pixels is preferably greater than 2 to 1 and more particularly is between 4 to 1 and 8 to 1. The pixels preferably have a short dimension not less than 2 microns and not greater than 8 microns, and may specifically be between 7 microns and 8 microns. Thus, the pixel array 704 is not drawn to scale with the frame 2 and PC board 4 in FIG. 3A. That is, for example, for 512 pixels each being 8 microns wide and, e.g., 64 microns tall, the sensor device 704 would have an effective area of about 4 mm×8 microns (which is substantially smaller than the relative dimensions of the sensor device 704 shown in FIG. 3A compared with the frame 2 and PC board 4). The advantageous elongated shapes of the preferred pixels provides an improved combination of high resolution of the bar code symbol 22 and high angular probability of capture of the bar code symbol image at the sensor device 704 compared with, e.g., a sensor device having a single row of square pixels.

Referring now to FIG. 3B, elements of the frame 2 of FIG. 3A are also exploded from their mounted positions for perspective. A PCB assembly 4a is shown having preferred dimensions of 7.1 mm in height by 19.5 mm in width. A chassis 2a is shown removed from its mount to the PCB assembly 4a. The chassis 2a has preferred dimensions of approximately 6.6 mm by 11.45 mm. A lens barrel 16a is shown exploded from the slot in the chassis 2a so that features of the lens system can be shown. The lens system preferably includes a first lens 16b preferably made of glass, an aperture 16c and a second lens 16d preferably made of plastic. A light pipe 18a and aperture 19 are also shown removed from their mount to the apparatus in the exploded view of FIG. 3B.

FIGS. 4A–4D illustrate four different embodiments of elongated LEDs corresponding to the LED 702 described above with reference to FIG. 3A in accordance with the preferred embodiment. Generally, the preferred LEDs of FIGS. 4A–4D, as well as the alternative LED 600 of FIG. 4E, each have a total die area which may be the same, i.e., having similar output power and having similar input power and total real estate requirements, although they differ in shape and/or power input configuration. In particular, the preferred LED dies 615, 635, 655, 675 are thinned in the focusing direction of the lens 18 of FIG. 1, i.e., the direction which produces the line thickness of the aiming beam 20, and the dies 615, 635, 655, 675 are elongated in the direction perpendicular to the scan lines of the bar code symbol 22.

Figure 4A:
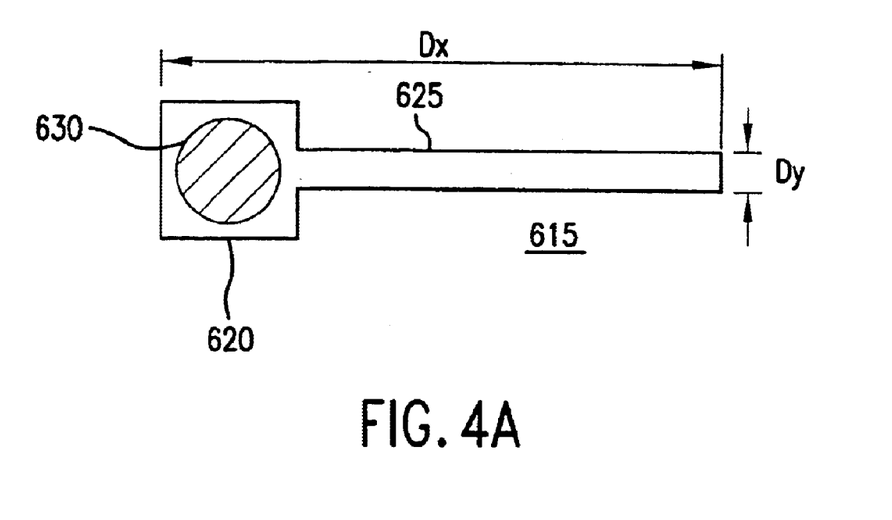
FIGS. 4A–4D schematically illustrate aiming beam LEDs in accordance with preferred embodiments.

Referring now to FIG. 4A, the LED 615 has a square portion 620 and a rectangular portion 625, the rectangular portion is the above-referred elongated portion. The square portion 620 has a bonding pad 630. Moreover, the LED 620 has dimensions of Dx by Dy, wherein Dy is the width of the elongated portion 625. Since the voltage which drives the LED is supplied via the bonding pad, the amount of light power emitting from the LED decreases the further the portion of the LED is from the bonding pad. Accordingly, in FIG. 4A, the amount of light power emitted from portions of the elongated portion 625 decreases for portions further to the right of the bonding pad 630. However, current LED technology provides sufficient luminescent intensity across the entire LED out to the right edge in FIG. 4A.

Figure 4B:
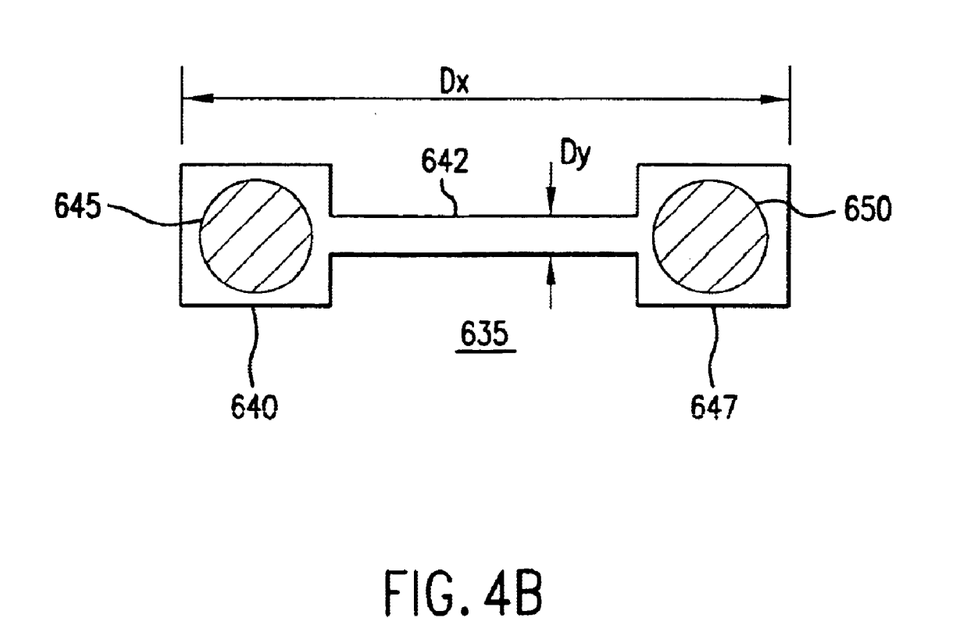

FIG. 4B illustrates a top view of an LED in accordance with another embodiment. Specifically, the LED 635 has two square portions 640 and 647 joined by a rectangular portion 642. Square portion 640 has bonding pad 645 located thereon and square portion 647 has bonding pad 650 located thereon. By placing bonding pads 645 and 650 on each side of the rectangular portion 642, a more uniform amount of light power emitted from the rectangular portion is achieved compared to the LED 615 illustrated in FIG. 4A.

Figure 4C:
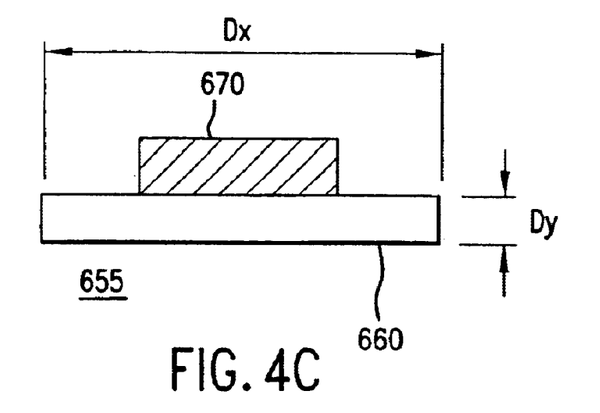

FIG. 4C illustrates a top view of an LED in accordance with yet another embodiment of the present invention. In accordance with this embodiment, a bonding pad 670 is placed adjacent to the rectangular portion 660 of LED 655. Accordingly, the bonding pad 670 does not block any light emitted from the elongated portion. Moreover, whereas the placement of the bonding pad in FIG. 4B may result in a reduced amount of light in the center of the rectangular portion, the placement of the bonding pad 670 in FIG. 4C ensures a more uniform distribution of light emitted from the center of the rectangular portion 660 of LED die 655.

Figure 4D:
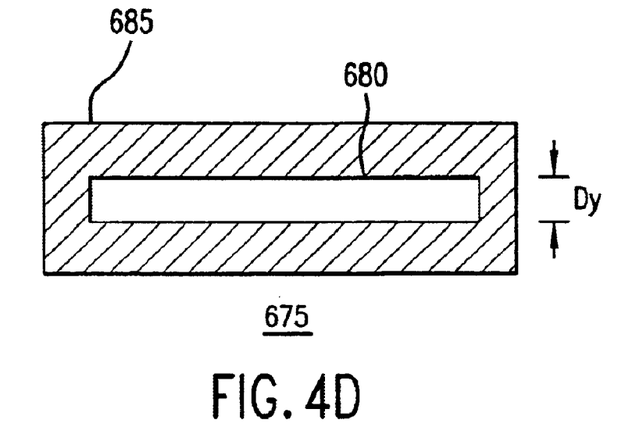

FIG. 4D illustrates a top view of an LED in accordance with a fourth embodiment. In accordance with this embodiment of the present invention, a rectangular portion 680 of the LED die 675 is surrounded on all sides by a bonding pad 685. By surrounding the rectangular portion 680 of the LED die 675 by the bonding pad 685, a uniform distribution of light emitted from the whole rectangular portion 680 of the LED die 675 is achieved compared to the LED dies illustrated in FIGS. 4A–4C.

In accordance with an exemplary embodiment, Dy in FIGS. 4A–4D may be reduced to less than or about 50 mm. To maintain sufficient emitting power, Dx, in FIGS. 4A–4D is advantageously selected, preferably around 1 mm, such that the total die area of the LED is such that sufficient emitting power is produced. In addition, the lens 18 of FIG. 1 is selected such that the aiming beam is focused to a thin, bright line for providing a sufficiently bright aiming beam 20, notwithstanding whether, if broadened, the beam would have sufficient power to illuminate the entire bar code symbol 22.

Figure 4E:
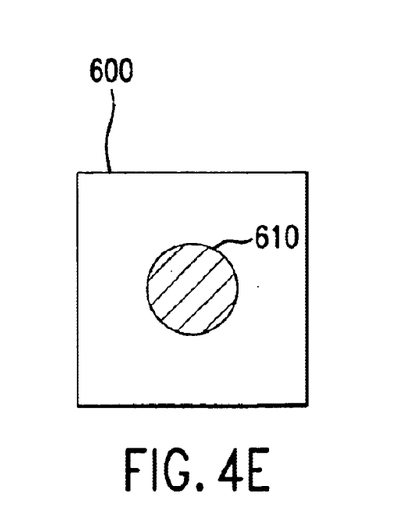
FIG. 4E schematically illustrates a square aiming beam LED in accordance with an exemplary alternative embodiment and illustrating advantages of the preferred embodiments of FIGS. 4A–4D.

FIG. 4E illustrates a top view of a square LED 600 such as may be used for generating a combined illumination/aiming beam, or even for providing only an aiming beam such as that mentioned above with reference to FIG. 1. For the reasons provided below, however, the LEDs 615, 635, 655 and 675 of FIGS. 4A–4D are preferred over the LED 600 of FIG. 4E. The LED 600 includes a bonding pad 610 through which electrical power is supplied to the LED 600. The LED 600 illustrated at FIG. 4E has a square shape and may have dimensions around approximately 300 mm by 300 mm. As illustrated in FIG. 4E, the bonding pad 610 may be typically placed in the middle of the LED 600. This placement of the bonding pad 610 blocks approximately 30% of the light power emitting from the LED 600. Moreover, as discussed above, the square LED of FIG. 4E produces less focused light than a laser, the result of which is projected light having an aspect ratio of 1:1 before being focused by lens 18.

The elongated LEDs 615, 635, 655 and 675 described above with reference to FIGS. 4A–4D, respectively, are preferred over the square LED 600 of FIG. 4E. This is because it is desired to have an aiming beam 20 that is focused to a narrow line that can be aimed to cross the entire bar code symbol 22, such as the highly linear aiming beam 20 illustrated at FIG. 1. Moreover, this aiming beam 20 is not otherwise needed to illuminate the bar code symbol 22 so that the reader 1 can capture it with sufficient intensity to resolve the scan lines. The aiming beam is preferably only used to align the reader 1, and thus a bright thin line is preferred over broad illumination, although the aiming beam may advantageously be used for both aiming and illumination. The advantageous LEDs 615, 635, 655 and 675 described above with reference to FIGS. 4A–4D, respectively, provide the desired bright, thin aiming beam 20, i.e., in conjunction with the lens 18 preferably having high power in the direction of the scan lines of the symbol 22 (e.g., the preferred lens 18 is a cylindrical/toroidal lens 18, as described above with reference to FIG. 1).

Figure 5:
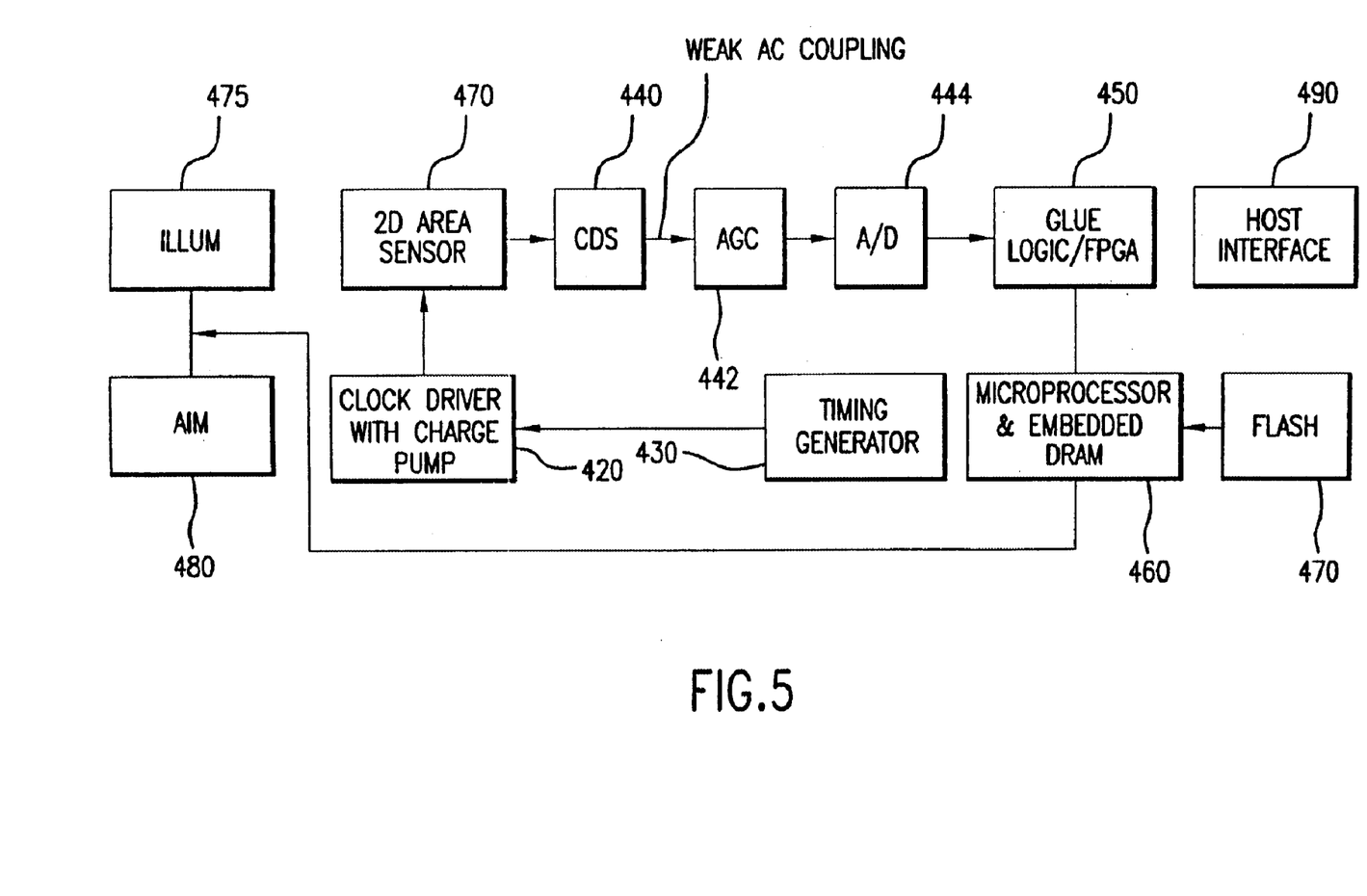
FIG. 5 schematically illustrates preferred electrical components of a bar code reader in accordance with a preferred embodiment.

FIG. 5 illustrates the electronics of a bar code reader in accordance with a preferred embodiment. These electronics include a two-dimensional sensor device 410 which is controlled via clock driver and charge pump 420. Clock driver and charge pump 420 are controlled in accordance with signals received from timing generator 430. An image captured by sensor device 410 is provided to correlated double sampling block 440. Since pixels do not always return to the same value when they are reset, correlated double sampling is used to remove the offset introduced by pixels which have not returned to their normal reset values. Accordingly, correlated double sampling involves capturing two values of the pixels, the first value is the value of the pixels with the desired image, e.g., a one-dimensional bar code, and the second value is the value of the pixels after being reset. The two values of each pixel are compared to remove the offset introduced by pixels which have not returned to their normal reset value. After performing the correlated double sampling, the image is passed through a weak AC coupling to block DC content of the correlated double sampled image. After the weak AC coupling, an automatic gain control 442 amplifies the signal which is then provided to an analog-to-digital converter 444. In accordance with a preferred embodiment of the present invention, the analog-to-digital converter is a nine bit analog-to-digital converter.

Digital data is provided by the analog-to-digital converter to the glue logic field programmable gate array (FPGA) block 450. The glue logic/FPGA 450 packs the digital data so that it can be read by microprocessor 460 and connects with the microprocessor 460 to provide all of the device controls. The microprocessor 460 includes DRAM embedded on the same IC as the microprocessor which increases the speed of the system while allowing a reduced size and cost for the resultant imager. The microprocessor 460 operates under control of a program stored in flash memory 470 via an external data and address bus.

The target image, e.g., such as the bar code symbol 22 of FIG. 1, is preferably sufficiently illuminated by ambient light due to the opto-electronic configuration of the preferred bar code reader 1 of FIG. 1, so that the bar code symbol 22 is resolvable without additional illumination. However, in an alternative embodiment, illumination may be provided by one or more 650 nm red LEDs of an optional illumination module 475. The LEDs would be arranged so that the target image is uniformly illuminated.

To assist a user of the reader 1, the preferred aiming module 480 is preferably used to provide a unique aiming pattern. Aiming module 480 can include an elongated LED (see FIGS. 3A and 4A–4D) and lens 18 of FIGS. 1 and 3, or alternatively may include a laser diode and a diffractive optical element (DOE) to provide the unique aiming pattern. Interaction between a host device which may incorporate the preferred bar code reader 1 of FIG. 1 may be provided using host interface 490 of FIG. 5. Since the preferred bar code reader 1 described herein is miniature, i.e., of a small form factor, a host device may be a portable radio telephone (cellular phone), a personal digital assistant (PDA), or the like. Using the elements described in connection with FIG. 5, a miniature bar code reader device can be achieved which can be manufactured in a SE900 or smaller form factor which may be used in the imager industry for the manufacture of imaging devices.

As described so far, the module 1 includes a one-dimensional, solid-state, image sensor 704 or a two-dimensional, solid-state, image sensor 410 for capturing an image of a target. Advantageously, the module 1 is positioned within a handheld device having a trigger which, when manually actuated, initiates image capture and, hence, reading of a bar code symbol 22 as the target. The LED 702 and the lens 18 together form the aiming line 20 on the symbol to facilitate proper positioning of the sensor relative to the symbol. In some cases where it is not desired to rely solely on ambient light to illuminate the symbol 22, the light from the LED 702 helps to illuminate the symbol. For aiming and/or illumination purposes, the LED is constantly energized so that the light emitted from the LED is constant.

As advantageous as the solid-state sensors are, they do not provide the same visual feedback as was provided by known moving laser beam scanners. A moving laser beam scanner typically sweeps a laser spot a plurality of times a second across a symbol, each sweep defining a scan line. Scan lines are typically swept at a rate of 20-40 scans per second. As a consequence, a user of the known moving beam scanner expects to see a flickering scan line on and across the symbol being read. With the solid-state system, no such flickering scan lines are present and, as a result, the user of a solid-state system does not experience any visual feedback. This is disadvantageous, because the user may be uncertain that the solid-state system is working.

Figure 6:
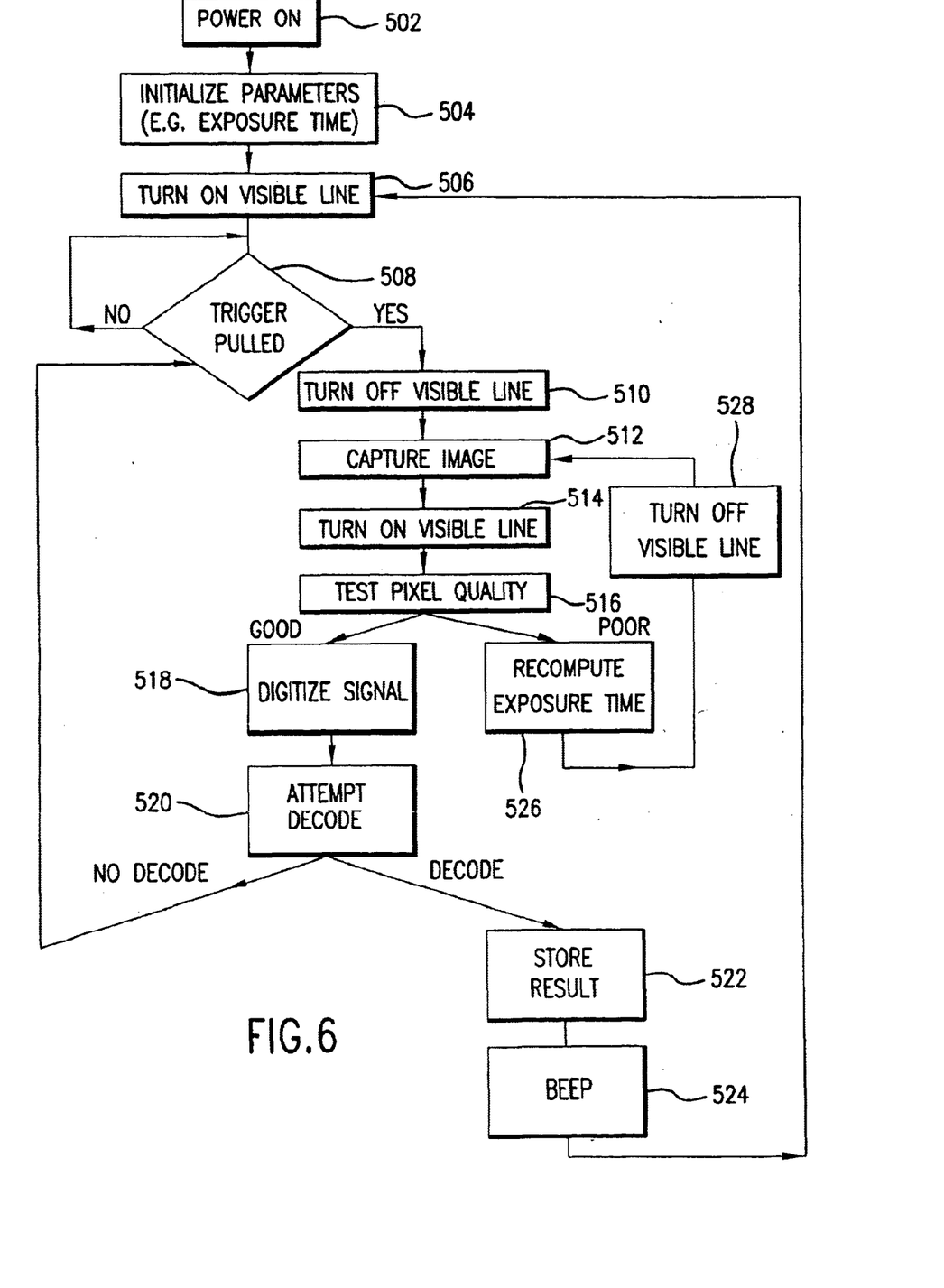
FIG. 6 illustrates a flow chart describing the image capture process according to the present invention.

To provide such feedback in a solid-state system, this invention proposes, as shown in the flow chart of FIG. 6, to use the LED 702 and the lens 18 to form a visible line on the symbol, and to turn the visible line on and off, thereby causing the visible line to flicker and simulate a moving laser beam.

After power is turned on (block 502), various parameters of the module, for example, the exposure time of the sensor are initialized (block 504). The LED 702 is energized, and the visible line 20 is turned on (block 506). Typically, the LED light by itself covers a wide area on the order of 1 cm wide. To better simulate laser light, the lens 18 narrows the width and, if necessary, an aperture stop can be used to narrow the width of the light emitted from the LED.

Once the sensor is properly facing the symbol, the trigger is pulled (block 508), and the visible line is turned off, thereby causing the visible line to flicker (block 510). The sensor captures the image of the target (block 512), after which, the visible line is turned on again (block 514). The pixel quality is tested (block 516) and, if found to be good, the electrical signal produced by the sensor is digitized (block 518) and attempted to be decoded (block 520). If not decoded, then the user is prompted to pull the trigger again. If decoded, then the decoded signal is processed, the result is stored (block 522), and auditory beep (block 524) is annunciated to signify a successful decode, and the system readies itself for the next symbol to be read.

If the pixel quality tested in block 516 is found to be poor, then the exposure time of the sensor is recomputed and adjusted, either longer or shorter (block 526). The initialized exposure time is typically 10 ms and is adjustable depending on ambient light from about 60 $\mu$s to about 30 ms. After adjustment, the visible line is turned off again (block 528) prior to capturing the image at block 512.

The flickering visible line simulates the experience of a user who previously was accustomed to operating moving laser beam scanners and increases the comfort level of the user who is new to using sensor-based systems.

It will be understood that each of the elements described above, or two or more together, also may find a useful application in other types of constructions differing from the types described above.

While the invention has been illustrated and described as embodied in an imaging reader with a moving beam simulation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent set forth in the appended claims.

We claim:

1. An arrangement for electro-optically reading indicia with visual feedback to a user, comprising:
    a) a solid-state image sensor operative for capturing an image of the indicia with a detector having an adjustable exposure time and for generating an electrical signal indicative of the indicia, during reading of the indicia;
    b) a light source for forming a visible light line across the indicia during reading of the indicia by the solid-state sensor; and
    c) means for directing the visible light line to and away from the indicia during reading of the indicia by the solid-state sensor to generate a flickering line that simulates for the user a fluctuating scan line generated by a moving beam electro-optical reader, the directing means being operative for adjusting the exposure time and for turning the visible light line off after the exposure time has been adjusted.

2. The arrangement of claim 1, wherein the light source includes a single light emitting diode.

3. The arrangement of claim 1, wherein the light source includes a linear array of light emitting diodes.

4. The arrangement of claim 1, wherein the light source includes a lens having a cylindrical surface.

5. The arrangement of claim 1, wherein the directing means is operative for energizing and alternately de-energizing the light source.

6. The arrangement of claim 1, wherein the detector is a charge coupled device array.

7. The arrangement of claim 1, wherein the detector is a complementary metal oxide semiconductor array.

8. The arrangement of claim 1, and a printed circuit board (PCB) on which the sensor and the source are mounted to form a module.

9. The arrangement of claim 8, wherein the module is mounted in a handheld device having a trigger which, upon manual actuation, actuates the solid-state sensor and turns the visible line off.

10. A method of electro-optically reading indicia with visual feedback to a user, comprising the steps of:
  a) reading the indicia by actuating a solid-state image sensor to capture an image of the indicia with a detector having an adjustable exposure time and to generate an electrical signal indicative of the indicia;
  b) forming a visible light line across the indicia during reading of the indicia by the solid-state sensor; and
  c) directing the visible light line to and away from the indicia during reading of the indicia by the solid-state sensor to generate a flickering line that simulates for the user a fluctuating scan line generated by a moving beam electro-optical reader, the directing step being performed by adjusting the exposure time and by turning the visible light line off after the exposure time has been adjusted.

11. The method of claim 10, wherein the forming step is performed by a single light emitting diode.

12. The method of claim 10, wherein the forming step is performed by a linear array of light emitting diodes.

13. The method of claim 10, wherein the forming step is performed by a lens having a cylindrical surface.

14. The method of claim 10, wherein the directing step is performed by energizing and alternately de-energizing the light source.

15. The method of claim 10, wherein the detector is a charge coupled device array.

16. The method of claim 10, wherein the detector is a complementary metal oxide semiconductor array.

17. The method of claim 10, and the step of mounting the sensor and the source on a printed circuit board (PCB) to form a module.

18. The method of claim 17, and the step of mounting the module in a handheld device having a trigger which, upon manual actuation, actuates the solid-state sensor and turns the visible line off.

* * * * *